Figure 1:
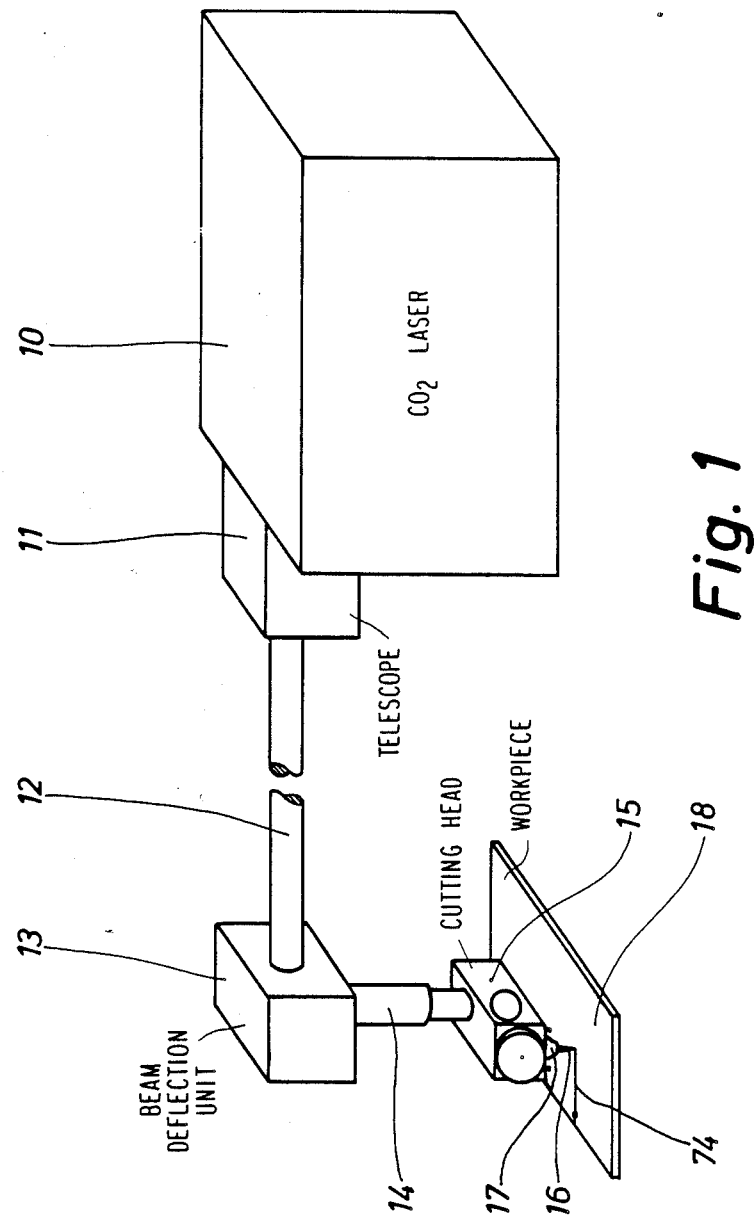

United States Patent [19]

Rothe et al.

[11] Patent Number: 4,780,592
[45] Date of Patent: Oct. 25, 1988

[54] APPARATUS FOR CUTTING WORKPIECES BY MEANS OF A HIGH-ENERGY BEAM

[75] Inventors: Rüdiger Rothe, Bremen; Karl W. E. Teske, Winsen; Gerd Sepold, Bad Zwixchenahn; Werner Jüptner, Ritterhude, all of Fed. Rep. of Germany

[73] Assignee: Bias Forschungs-Und Entwicklungs-Labor Fur Angewandte Strahltechnik GmbH, Bremen, Fed. Rep. of Germany

[21] Appl. No.: 907,920

[22] Filed: Sep. 16, 1986

[30] Foreign Application Priority Data

Sep. 17, 1985 [DE] Fed. Rep. of Germany ....... 3533167

[51] Int. Cl.$^4$ ............................................. B23K 26/14
[52] U.S. Cl. ............................ 219/121.67; 219/121.84
[58] Field of Search ................. 219/121 LG, 121 LN, 219/121 L, 121 LM, 121 LC, 121 LD, 121 FS, 121 LH, 121 LJ, 121 LE, 121 LF

[56] References Cited

U.S. PATENT DOCUMENTS

| 3,562,486 | 2/1971 | Hatch et al. | 219/121 PM |
| 3,600,065 | 8/1971 | Law | 219/121 FS |
| 3,604,890 | 9/1971 | Mullaney | 219/121 LG |
| 3,696,230 | 10/1972 | Friedrich | 219/121 LG X |
| 4,221,025 | 9/1980 | Martens et al. | 24/150 R |

FOREIGN PATENT DOCUMENTS

| 8337305 | 4/1984 | Fed. Rep. of Germany . | |
| 0131543 | 10/1979 | Japan | 219/121 FS |
| 0024596 | 2/1984 | Japan | 219/121 FS |
| 0007593 | 2/1985 | Japan | 219/121 FS |

Primary Examiner—C. L. Albritton
Attorney, Agent, or Firm—Sughrue, Mion, Zinn, Macpeak & Seas

[57] ABSTRACT

In the cutting of workpieces by means of a laser beam, gas is blown onto the workpiece at high speed together with the beam. It is proposed to design gas outflow nozzles (60) in such a way that they are formed as grooves in the conical end face (49) of a nozzle insert (47) and, on the other hand, are formed by a nozzle cap (48) which has a portion of such a matching conical shape that the grooves are covered. It is also proposed to provide a unifying chamber (formed by an attached cap), in which the gas jets are unified, so that they then flow out, together with the laser beam, as a single gas jet.

16 Claims, 6 Drawing Sheets

APPARATUS FOR CUTTING WORKPIECES BY MEANS OF A HIGH-ENERGY BEAM

Focused laser or electron beams are used for drilling and cutting metallic materials particularly with high precision. The cutting widths are usually around 1/10 mm. So that such narrow cutting gaps can be obtained with clean cutting faces, the material to be eliminated has to be removed completely, specifically quickly enough to ensure that the material cannot condense in the thin cutting gap. With an increasing working speed and depth of the cutting gaps, the difficulty of clearing away the material increases correspondingly. Working gas or cutting gas supplied at a high rate is used to clear away the material.

German utility model No. 8,337,305 discloses a cutting head with a cutting nozzle, from which the jet of working gas emerges. Several gas outflow nozzles for working gas are provided in the cutting nozzle. At the same time, the jets of working gas are directed towards the workpiece obliquely relative to one another, thus producing a single gas jet which (initially) flows parallel to the laser beam. However, it is difficult to produce gas outflow nozzles of this type. Furthermore, soiled gas outflow nozzles of this kind are very difficult to clean.

Similar gas outflow nozzles are known from U.S. Pat. Nos. 3,725,633 and 3,725,611, and in these cases the increase in the flow rate of the jet of working gas always takes place in the exit bore, into which further nozzles open if appropriate. These known apparatuses are also relatively difficult to clean and moreover have a relatively high consumption of working gas. Starting from the state of the art mentioned above, the object on which the present invention is based is to further develop an apparatus of the type mentioned in the introduction, so that the consumption of working gas is as low as possible and dirt can easily be eliminated.

Because the gas outflow nozzles are designed according to the invention as grooves which are covered by a cap, it is possible to produce high-precision nozzles in a relatively simple way by means of milling. Again as a result of the precision, a high jet speed (up to 2 mach) can be achieved, specifically whilst at the same ensuring a low gas consumption. Cleaning is carried out in a very simple way by removing the nozzle cap so that the gas nozzles are exposed.

In a further way of achieving the object proposed in the introduction, which, if appropriate, can also be used independently, a unifying chamber is provided. This again guarantees further protection against soiling, and the unifying chamber makes it possible to achieve further measures to control the unified gas jets.

Surprisingly, it has been shown that a single gas outflow nozzle can be used, and that it is therefore unimportant to obtain a symmetrical arrangement of several gas outflow nozzles. This teaching running counter to previous solutions leads to a further-reduced gas consumption, without the effectiveness of the arrangement thereby being diminished to any appreciable extent.

Further preferred embodiments of the invention emerge from the subclaims and from the following exemplary embodiments.

Figure 2:
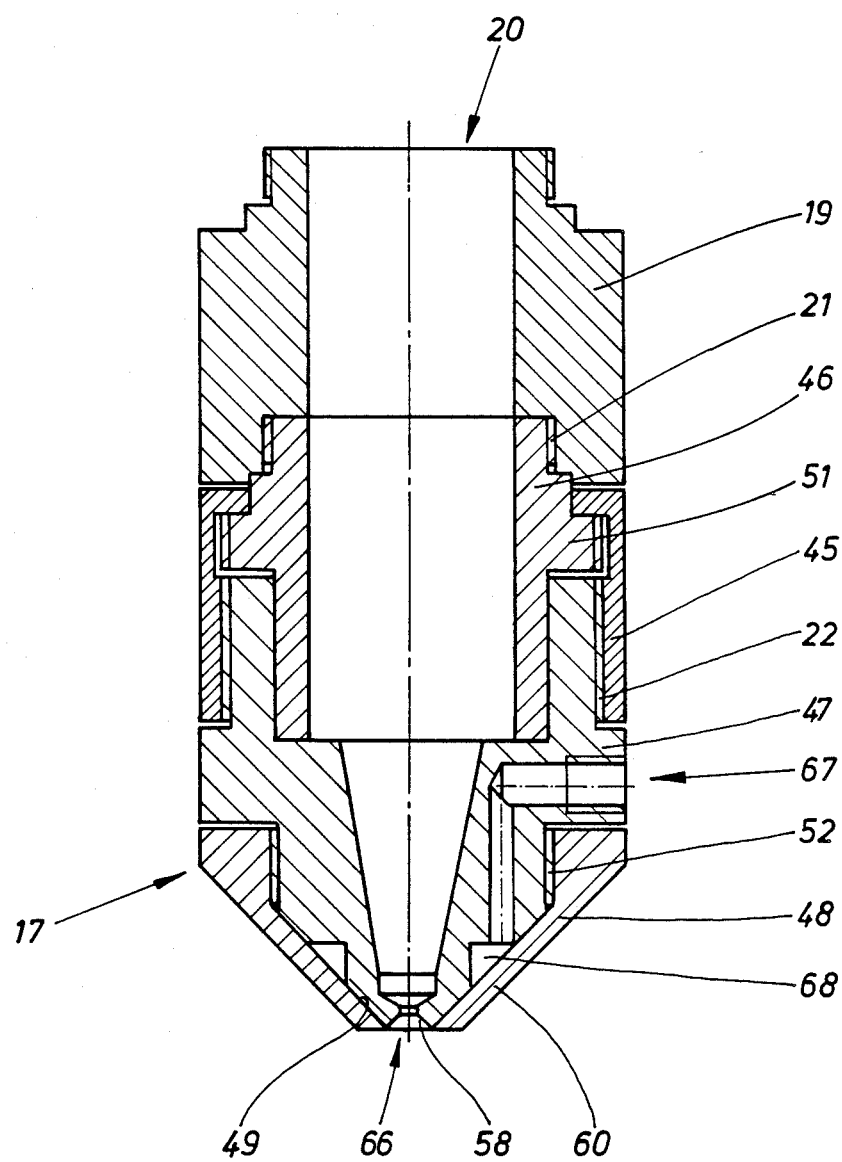
Figure 3:
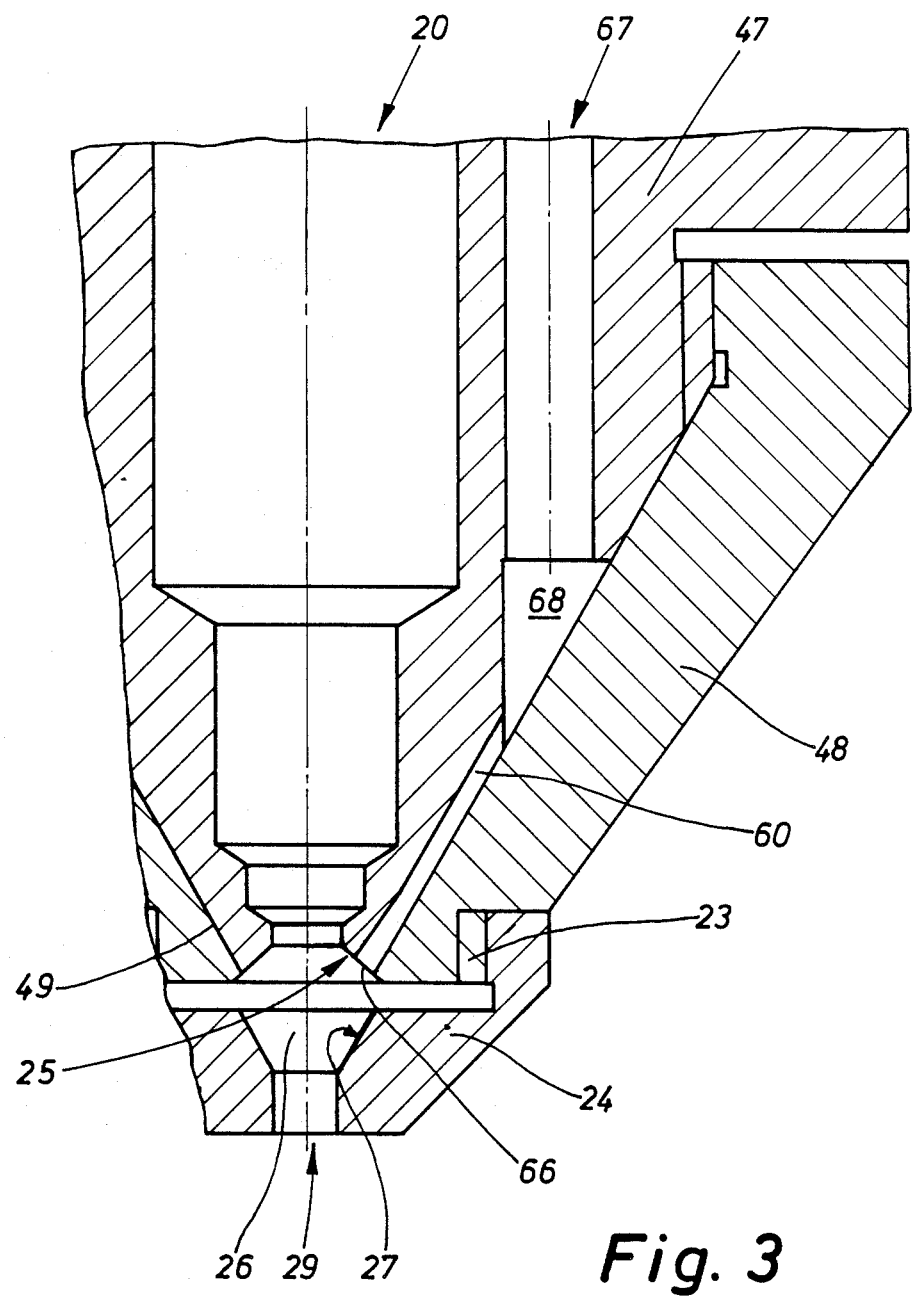
Figure 4:
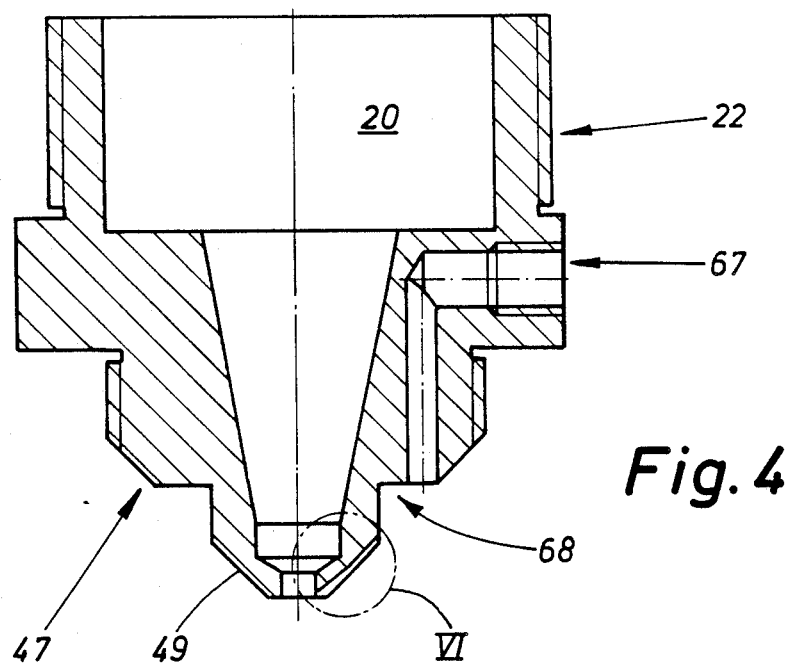
Figure 5:
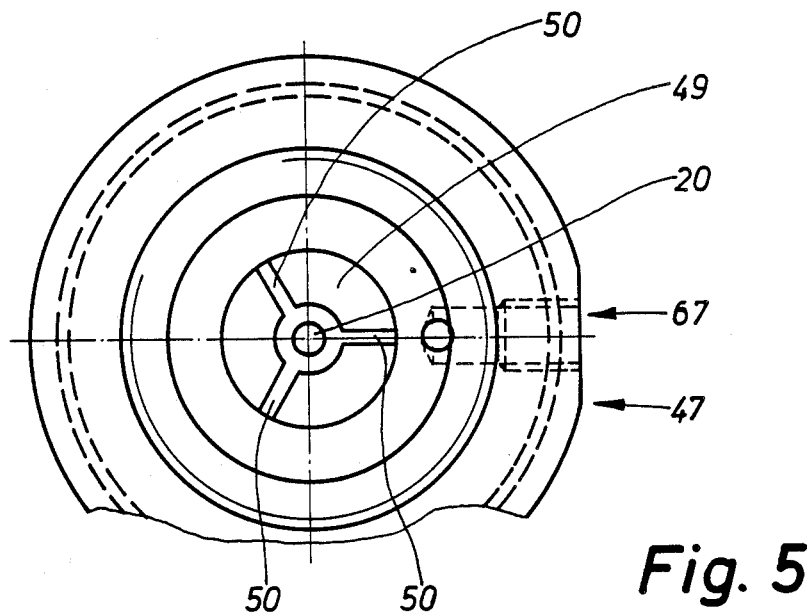
Figure 6:
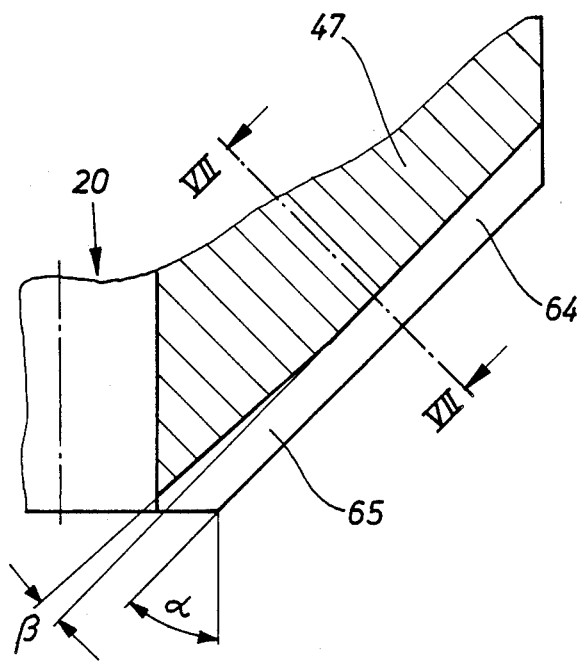
Figure 7:
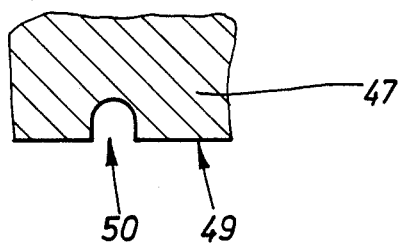
Figure 8:
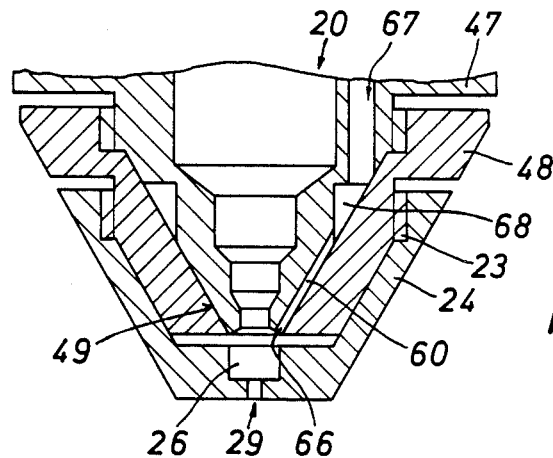
Figure 9:
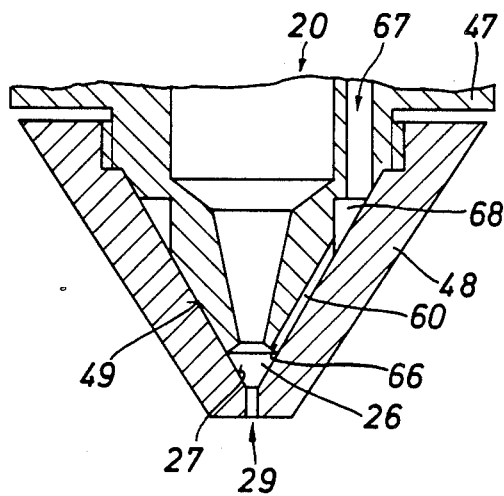

Preferred embodiments of the invention are described in detail below with reference to figures, in which:

FIG. 1 shows a diagrammatic representation of a laser cutting apparatus from outside, FIG. 2 shows a longitudinal section through the cutting nozzle of a first preferred embodiment of the invention, FIG. 3 shows a longitudinal section through the end part of the cutting nozzle of a second preferred embodiment of the invention, FIG. 4 shows a longitudinal section through the inner part of the cutting nozzle according to FIG. 3, FIG. 5 shows a plan view (from below) of the part according to FIG. 4, FIG. 6 shows an enlarged cut-out of the zone designated by VI in FIG. 4, FIG. 7 shows a section along the line VII—VII of FIG. 6, and FIGS. 8 and 9 show third and fourth preferred embodiments of the invention, only a single nozzle being provided in each of these.

The basic design of a laser cutting apparatus is described below with reference to FIG. 1. The apparatus comprises, as an energy source, a $CO_2$ laser 10, at the beam exit of which a telescope 11 is located. The telescope 11 is connerted via a protective tube 12 to a deflection unit 13, by means of which the beam coming from the source 10 is deflected downwards. The deflection unit 13 is connected to the actual cutting head 15 via a protective tube 14 of variable length. In the cutting head 15, the laser beam is once again deflected and focused, in such a way that the emergent focused beam pencil 16 falls onto a workpiece 18 arranged horizontally. When the beam is of appropriately high energy and the workpiece 18 is moved, a cutting gap 74, in which the material of the workpiece 18 has been vaporized, is then obtained.

A first preferred embodiment of a cutting nozzle 17 is described in detail below with reference to FIG. 2. The cutting nozzle 17 comprises a housing 19 which is screwed into the cutting head 15. At the end facing away from the cutting head 15, the housing 19 is provided with a threaded bore, into which an extension piece 46 is screwed. The extension piece 46 and the housing 19 have a concentric bore 20, through which the laser beam passes (concentrically). Furthermore, the extension piece 46 is equipped with a flange (51) which projects radially outwards. At the same time, the flange 51 is located at such a distance from the housing 19 that an annular gap is formed. Seated in this annular gap is that end of a union nut 45 which has no thread, but a collar projectng inwards. At the other end, the union nut 45 is provided with an internal thread.

A nozzle insert 47 is attached on the extension piece 46 essentially flush with an inner bore and is clamped by means of the union nut 45, so that the nozzle insert 47 is connected firmly to the housing 19 or the cutting head 15 by the extension piece 46.

The nozzle insert 47 has a conical inner bore which continues the passage bore 20 for the laser beam. The nozzle insert 47, at its end facing away from the extension piece 46, is equipped with an external thread 52. Furthermore, opposite the extension piece 46 the nozzle insert 47 terminates in a conical end face 49 arranged concentrically relative to the passage bore 20. An annular groove 68 is cut into the conical end face 49. A bore leads from the annular groove 68 parallel to the passage bore 20 into a further bore which extends perpendicularly relative to the passage bore 20 and has an internal thread at its end and which, together with the first bore, forms a feed bore 67 for supplying working gas.

Screwed onto the thread 52 of the nozzle insert 47 is a nozzle cap 48, the inner face of which is of a shape matching that of the conical end face 49. The cap 48 at its end is essentially flush with the nozzle insert 47, that is to say is open at the end. This open end communicates with the passage bore 20 via a (tapered) bore.

Milled into the conical end face 49 are grooves (only one of which is shown in FIG. 2) which are closed by the flush-fitting inner face of the cap 48 and which thus form gas outflow nozzles 60. The gas outflow nozzles 60 open out essentially at the mouth orifice of the passage bore 20 or at the laser exit orifice 58 so formed. The laser exit orifice 58 is formed by a conical bore, the angle of which is calculated so that the surfaces onto which the gas outflow nozzles 60 open extend essentially perpendicularly relative to the longitudinal axes of the gas outflow nozzles 60.

During operation, the laser beam is conveyed through the passage bore 20, focused in such a way that its focal point is located outside the cutting nozzle 17. Working gas (e.g. oxygen) is supplied under high pressure via the feed bore 67. The working gas passes through the feed bore 67 into the annular groove 68 and from the latter into the gas outflow nozzles 60. The gas jets flowing out of the gas outflow nozzles 60 unite and flow downwards at high speed as a common jet, essentially along the axis of the passage bore 20. In this way, the working gas is guided exactly into the cutting gap in order to clear it out.

A further preferred embodiment of the invention is described in detail below with reference to FIG. 3.

In this, the parts already described with regard to FIG. 2 bear the same designations and are not mentioned again. In the example illustrated in FIG. 3, a further cap 24 is screwed onto the end of the nozzle cap 48 facing the workpiece by means of a thread 23 provided there. The cap 24, at its end facing the workpiece, has an essentially cylindrical bore 29 as an exit bore and, its end facing the nozzle cap 48, has a conical bore 27.

The conical bore 27, together with the conical bore 25 which at the same time forms the outflow surfaces for the gas outflow orifices 66, forms a chamber 26 in which the jets of working gas flowing out of the gas outflow orifices 66 unite. Thus, a single jet of working gas flows out of this unifying chamber 26, together with the laser beam, through the exit bore 29 in the direction of the workpiece. With suitable dimensions of the exit bore 29 and of the gas outflow nozzles 60 (or with the pressure of the working gas appropriately calculated), it is possible with this arrangement, in conjunction with the unifying chamber 26, to achieve the special effect that a gas jet flows out of the exit bore 29 at supersonic speed and is surrounded by an envelope (of working gas) flowing at substantially lower speed. This "envelope" acts as it were as protection preventing gas from being dragged along from the surrounding atmosphere, and consequently such gas can no longer penetrate into the cutting gap. Furthermore, the cap 24 provides protection against soiling from outside (which necessarily occurs during operation), and the cap 24 can be cleaned or even merely exchanged, without at the same time having to take apart the rest of the arrangement (assembled with the finest possible adjustment). It is essential, at the same time, that the unification of the jets of working gas should take place substantially unimpeded in the unifying chamber 26, specifically so that a slight excess pressure builds up in the unifying chamber 26.

Of course, a cap 24 of this type with a unifying chamber 26 can also be used in nozzle arrangements in which the actual gas outflow nozzles 60 are designed not as grooves in a conical surface, but as separate bores.

FIG. 4 shows further details of the arrangement according to FIG. 3, the caps 24 and 48 not being illustrated in this figure. As is clear from FIG. 5, three grooves 50 terminating essentially at the passage bore 20 are formed in the conical surface 49. The grooves 50 are shown in more detail in FIGS. 6 and 7 and will be described below.

The conical end face 49 has an angle α of approximately 30° relative to the longitudinal axis of the passage bore 20 (see FIG. 6). In the end region, that is to say in that region adjacent to the passage bore 20, the groove 50 is formed in a region 65 in such a way that its bottom descends at an angle β, so that the groove becomes successively deeper in the direction of the passage bore 20. The angle β is approximately 3° to 4°, preferably 3.5°. At the same time, the bottom of the groove 50 is made semicircular, as shown plainly in FIG. 7. As a result of this design of the groove 50 with a "plane" region 64 which merges into a widening region 65, a Laval nozzle is formed (after the cap 48 has been attached) and serves for increasing the speed of the gas jet into the supersonic range. Nozzles of this type, when designed as conventional bores, are very difficult to produce, specifically because of the slight, but very precise gradient required; in the present case, the nozzle shape can be produced very easily, but nevertheless with high accuracy because it is designed as a groove 50.

A further preferred embodiment of the invention is described in detail below with reference to FIG. 8. Here, only a single outflow nozzle 60 is provided, the gas outflow orifice 66 of which is directed towards an exit bore 29 and opens into a unifying chamber 26. This unifying chamber 26 is designed as a cylindrical blind bore and is therefore extremely simple to produce. Surprisingly, it has been shown, in particular, that even a jet flowing out of a single gas outflow orifice 66 emerges from the exit bore 29 at high speed without too much swirling, that is to say without substantial losses, and thus clears out the cutting gap. It can easily be imagined that, as a result of this arrangement, the gas consumption is reduced substantially and, furthermore, production made essentially easier (only a single groove being required).

FIG. 9 illustrates an embodiment simplified even further. In this embodiment, once again a single gas outflow nozzle 60 or a corresponding groove in the nozzle insert 47 is provided. Here, however, the unifying chamber 26 is formed as a direct continuation of the (internally) conical end face of the nozzle gap 48, so that the inflow orifice 27 to the exit bore 29 has the same angular inclination as the remaining internally conical part. This embodiment of the invention is especially simple, the screw cap 24 being omitted here.

Of course, the idea illustrated in FIG. 9 can also be used in the embodiments described further above, that is to say in conjunction with several gas outflow nozzles 60.

We claim:

1. An apparatus for cutting workpieces by means of a high-energy electromagnetic beam, with a cutting head having a cutting nozzle, from which the beam emerges, comprising at least one gas outflow nozzle for working gas in the cutting nozzle, wherein each gas outflow nozzle, on the one hand, is formed by a groove (50) in a conical end face (49) of a nozzle insert (47) having a concentric passage bore (20) for the beam, and on the other hand is formed by a nozzle cap (48) which is removably attached onto the nozzle insert and which has a portion of such a matching conical shape that each groove (50) is covered by the cap.

2. An apparatus as claimed in claim 1, wherein each groove (50), at its distal end in relation to the passage bore (20), opens into an annular groove (68) in the conical end face (49), and wherein a feed bore (67) in the nozzle insert (47) opens into the annular groove (68) to supply working gas.

3. An apparatus as claimed in claim 1, wherein each groove (50), at least in portions, is formed in the conical end face (49) to a depth increasing in the direction of the passage bore (20), so that each outflow nozzle (60) is designed as a nozzle for increasing the flow rate of the working gas to a supersonic velocity, especially as a Laval nozzle.

4. An apparatus as claimed in claim 1, wherein several grooves (50) are provided, and the gas outflow orifices (66) of the gas outflow nozzles (60) are arranged uniformly round the passage bore (20) on the conical end face (49).

5. An apparatus as claimed in claim 4, wherein the gas outflow nozzles (60) are arranged in such a way that their longitudinal axes meet at a common point of intersection located on the longitudinal axis of the beam.

6. An apparatus as claimed in claim 4, wherein the conical end face (49) forms an angle of 30°–45°, preferably an angle of 30°, relative to the center axis of the passage bore (20).

7. An apparatus as claimed in claim 1, wherein the passage bore (20) for the beam is made to widen conically in the mouth region of each gas outflow nozzle (60), in such a way that each gas outflow orifice (66) of a gas outflow nozzle (60) is located in an outflow surface (25) which extends essentially perpendicularly relative to the longitudinal axis of each gas outflow nozzle (60).

8. An apparatus for cutting workpieces by means of a high-energy electromagnetic beam, with a cutting head having a cutting nozzle from which the beam emerges, with at least one gas outflow nozzle for working gas in the cutting nozzle, and with a common unifying chamber (26) formed by a cap (24) on said cutting nozzle, wherein a gas outflow orifice (66) of each gas outflow nozzle (60) opens into said common unifying chamber (26) into which a concentric passage bore (20) for the beam also opens, the unifying chamber (26) having opposite the passage bore (20) only a single exit bore (29) for the beam and the working gas.

9. An apparatus as claimed in claim 8, wherein said cap (24) is fastened removably to the cutting nozzle (27).

10. An apparatus as claimed in claim 8, wherein the unifying chamber (26) has, opposite the exit bore (29), an inflow guide (27) for the jet of working gas.

11. An apparatus as claimed in claim 10, wherein the inflow guide (27) is designed as a conical portion of the exit bore (29).

12. An apparatus as claimed in claim 8, wherein the exit bore (29) has a diameter which is slightly greater than that of the outflowing jet of working gas.

13. An apparatus as claimed in one of claims 1 or 8, wherein only a single gas outflow nozzle (60) is provided.

14. An apparatus as claimed in claim 8, wherein each gas outflow nozzle (60), on the one hand, is formed by a groove (50) in a conical end face (49) of a nozzle insert (47) having the concentric passage bore (20) for the beam, and on the other hand is formed by a nozzle cap (48) which is removably attached onto the nozzle insert and which has a portion of such a matching conical shape that the particular groove (50) is covered by the cap.

15. An apparatus as claimed in one of claims 1 or 14, wherein the bottom of each groove (50) has an essentially semicircular cross-section.

16. An apparatus as claimed in claim 14 wherein the cap (24) is removably attached to said nozzle cap (48).

* * * * *